June 25, 1940.   J. V. CAPUTO   2,205,680
WELDING ELECTRODE
Filed Oct. 28, 1937   5 Sheets-Sheet 1

INVENTOR
James V. Caputo
by his attorneys
Stebbins, Blenko & Parmelee

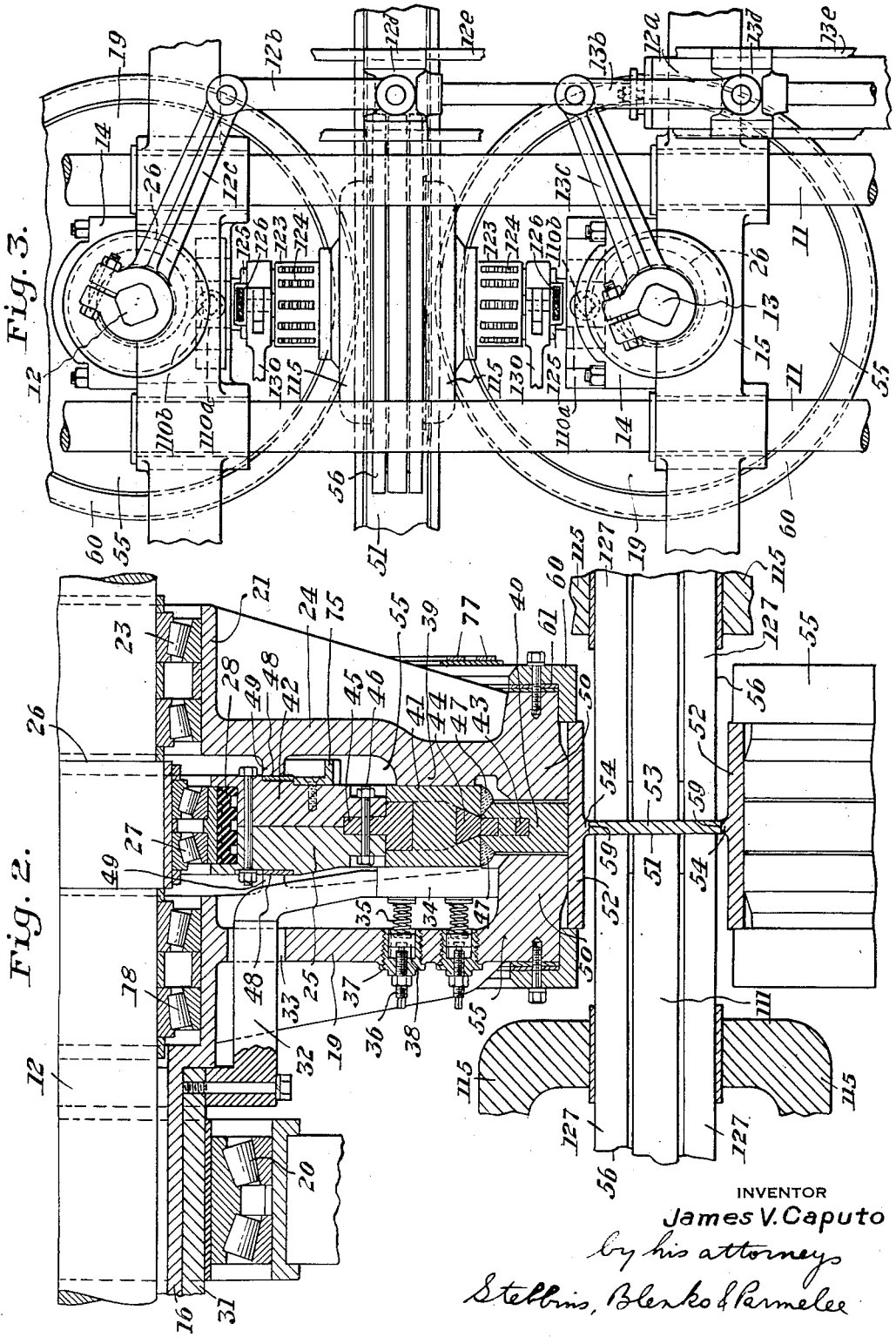

June 25, 1940.                    J. V. CAPUTO                    2,205,680
                                WELDING ELECTRODE
                    Filed Oct. 28, 1937              5 Sheets-Sheet 3
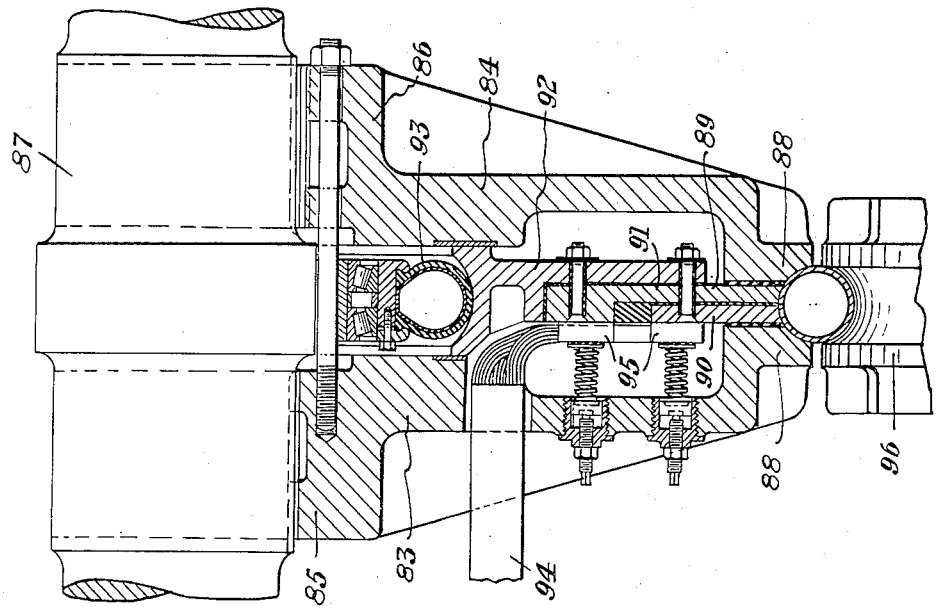
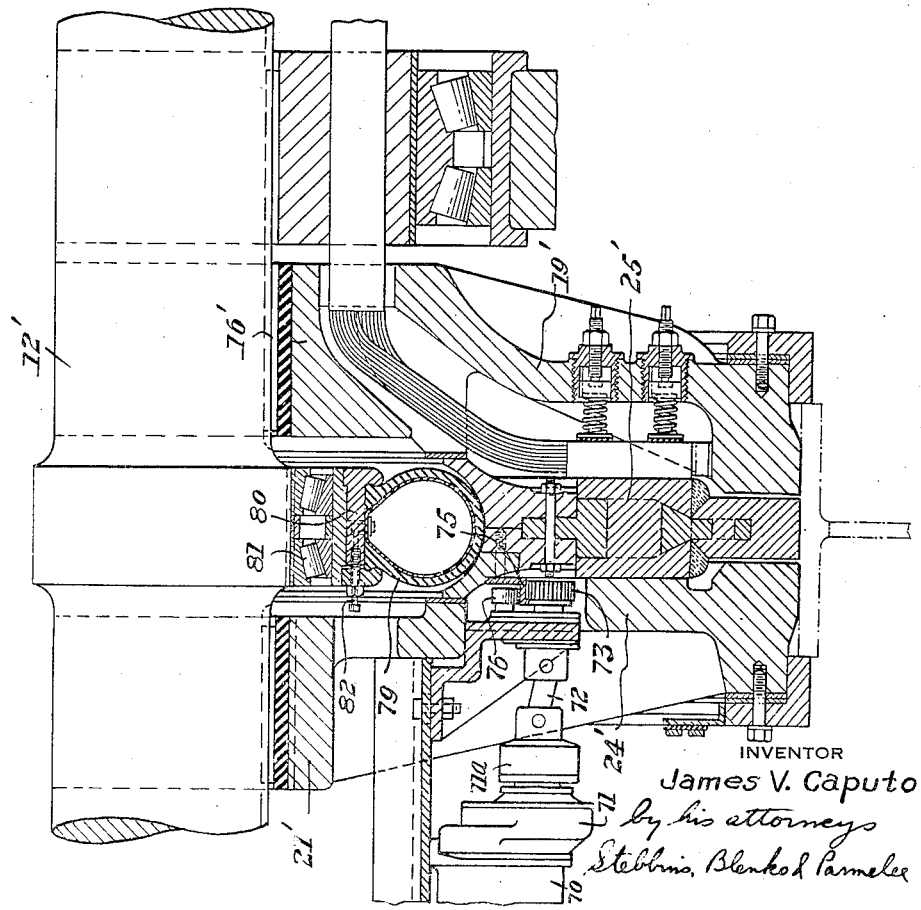
INVENTOR
James V. Caputo
by his attorneys
Stebbins, Blenko & Parmelee

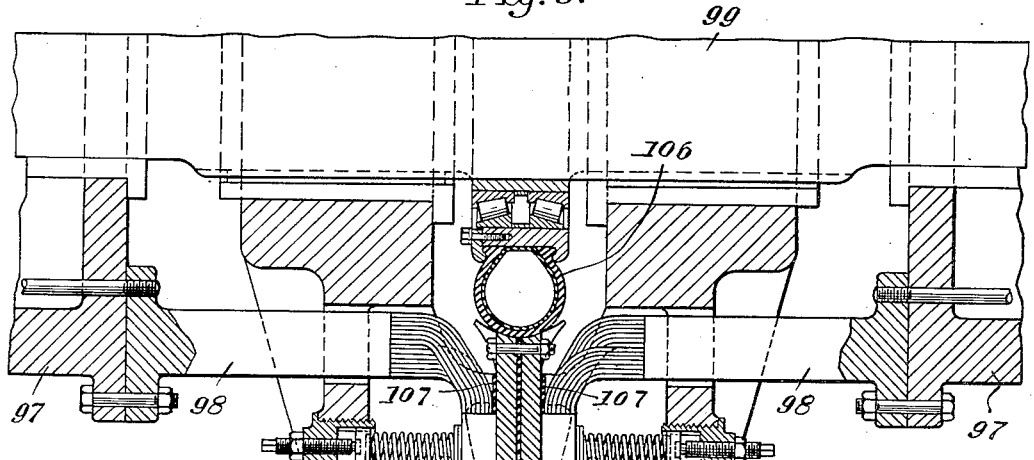
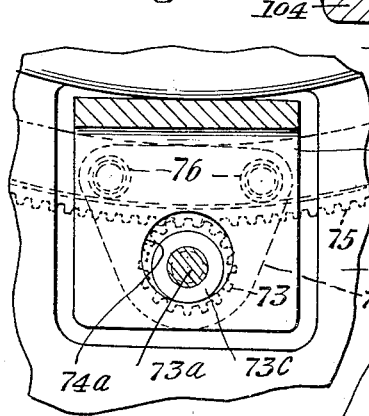
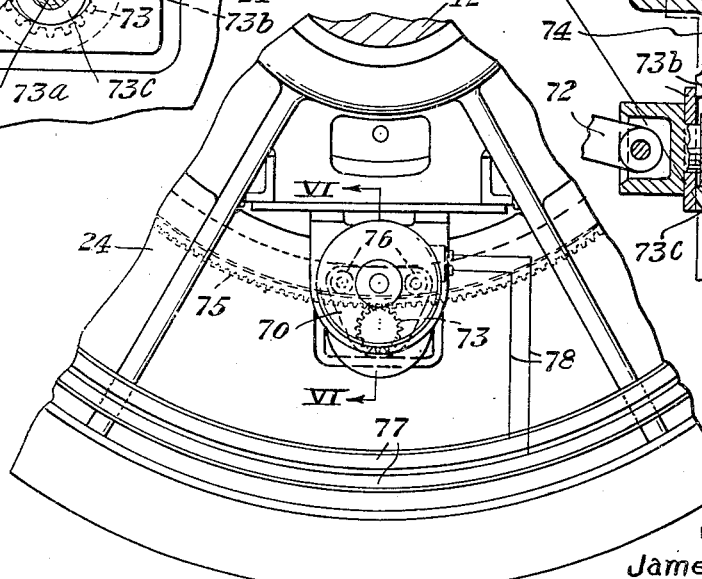

June 25, 1940. J. V. CAPUTO 2,205,680
WELDING ELECTRODE
Filed Oct. 28, 1937 5 Sheets-Sheet 5
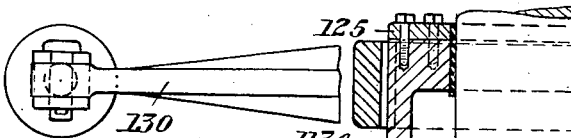
Fig. 10.
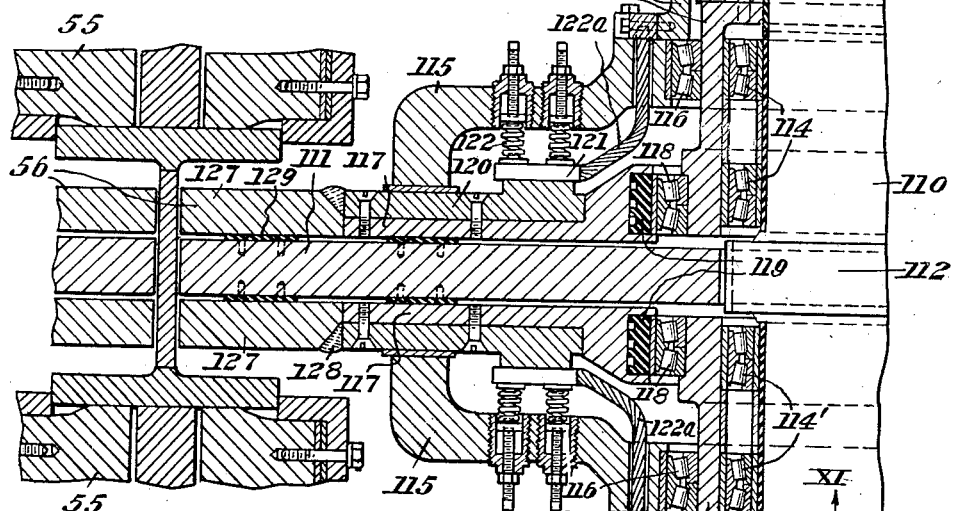
Fig. 12.
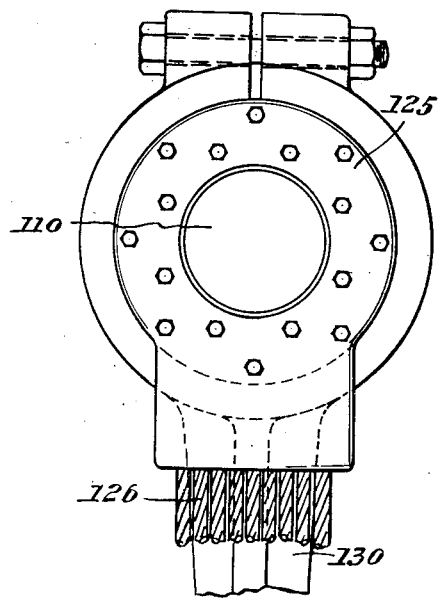
Fig. 11.
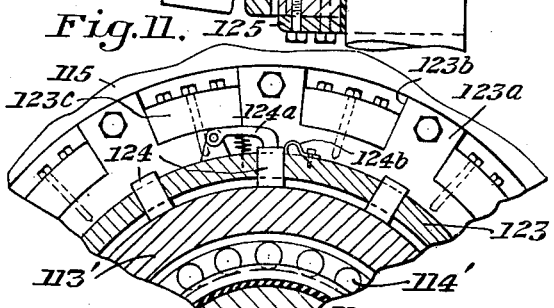
INVENTOR
James V. Caputo
by his attorneys
Stebbins, Blenko & Parmelee Patented June 25, 1940

2,205,680

UNITED STATES PATENT OFFICE 2,205,680

WELDING ELECTRODE

James V. Caputo, Crafton, Pa.

Application October 28, 1937, Serial No. 171,404

14 Claims. (Cl. 219—4)

This invention relates to the art of welding and in particular to an electrode adapted for progressively welding together abutting metallic surfaces.

It has been customary heretofore in practicing progressive electrical resistance welding to employ a roller contact electrode forming part of a so-called welding throat through which the material to be welded is passed. The abutting edges of the work are heated to fusion temperature by current supplied thereto by the electrode and the fused edges pressed together to complete the weld. Because of the necessity for conducting large heating currents to the work, the electrode has usually been made of copper because of the high electrical conductivity thereof. Copper however, does not possess very great hardness or durability and this characteristic of the material seriously limited the pressures which could be applied by the electrode to bring about the desired closing of the seam cleft and completion of the weld. The zone of application of such pressure as it has been possible to create with electrodes known heretofore has, furthermore, coincided exactly with the zone of maximum welding current and temperature.

I have invented a novel welding electrode and method which overcomes the aforementioned objections to the previous practice in this field. In accordance with my invention I provide an electrode having a conducting portion composed of copper or other highly conductive material and a pressure applying portion composed of some material well suited for this function, disposed adjacent the conducting portion. I provide independent supporting and adjusting means for the conducting portion whereby, regardless of wear, it can be caused to exert sufficient pressure on the work to obtain good electrical contact therewith. The pressure applying portion of the electrode, however, is relied upon to exert most of the pressure contributing to the welding. The invention also contemplates the application of the pressure necessary to effect a weld in a zone different from that in which the welding current is delivered. This method insures heating of the material to the proper temperature before maximum welding pressure is applied. I also provide independent driving means for the conducting and pressure applying portions respectively of the electrode.

A complete understanding of the invention may be gained from the following detailed description thereof which is to be read in connection with the accompanying drawings illustrating a present preferred embodiment and practice.

In the drawings:

Figure 2 is a partial sectional view to enlarged scale taken on a plane at right angles to that on which the section through a portion of the apparatus shown in Figure 1 is taken;

Figure 3 is a partial end elevation taken from the left of Fig. 1, and is largely diagrammatic;

Figure 4 is a view similar to Fig. 2 illustrating a modification;

Figure 5 is a partial end elevation of the structure shown in Fig. 4 looking from the left, with a portion in section;

Figure 6 is a sectional view to enlarged scale along the line VI—VI of Fig. 5;

Figure 7 is a sectional view taken along the line VII—VII of Fig. 6;

Figure 8 is a view similar to Fig. 2 showing a further modification;

Figure 9 is another view similar to Fig. 2 showing a still further modification;

Figure 10 is a view similar to Fig. 2 illustrating a modification of the electrode shown in the latter for cooperation therewith;

Figure 11 is a partial sectional view along the line XI—XI of Fig. 10, with parts rotated from their true position for the sake of clearness, and Figure 12 is a partial plan view as would be seen by looking down on the structure of Fig. 10.

Figure 1:
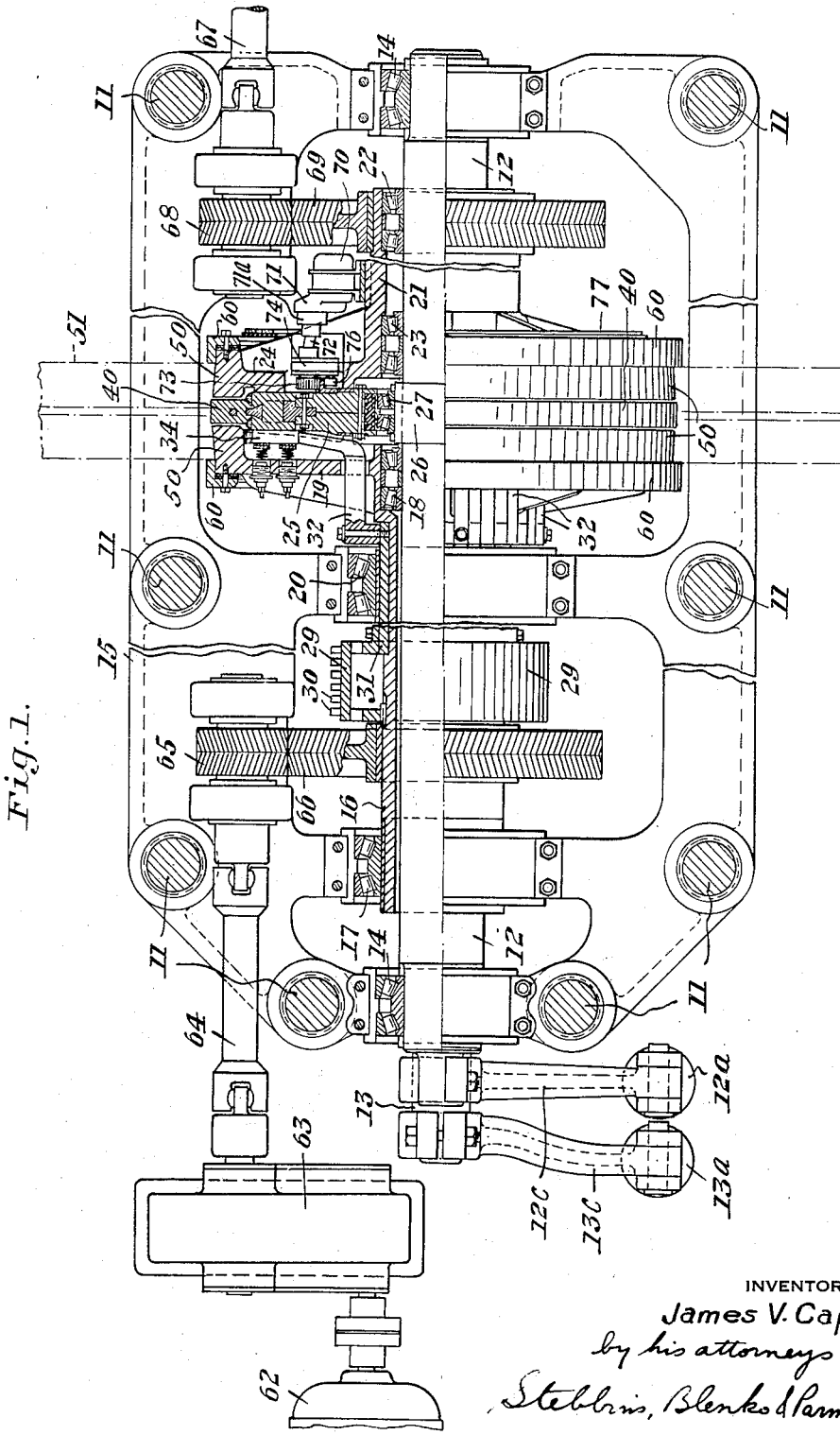
Figure 1 is a plan view, partly broken away and partly in section, of an apparatus embodying the invention.

Referring now in detail to the drawings and for the moment to Figures 1 through 3, a welder in accordance with my invention comprises a base having columns 11 upstanding therefrom. Shafts 12 and 13 extending longitudinally of the base are journalled in bearings 14. The latter are disposed in bearing carriages 15 slidably disposed on the columns 11 and adjustable vertically by any convenient means (not shown). A sleeve 16 is disposed on the shaft 12. One end of the sleeve is rotatably supported in bearings 17 disposed in the upper carriage 15. The other end of the sleeve is supported by bearings 18 on the shaft 12. An annular flange or disk 19 is formed at the end of the sleeve 16 adjacent the bearings 18. Bearings 20 on the carriage 15 cooperate with the bearings 17 and 18 to support the sleeve 16 for rotation. A second sleeve 21 is disposed about the other end of the shaft 12, being supported for rotation thereon by bearings 22 and 23. An annular flange or disk 24 is formed on the sleeve 21. The sleeves and the disks 19 and 24 are preferably formed of steel or similar material. An annular conducting member 25 is disposed between disks 19 and 24 and is rotatably supported on an eccentric portion 26 of the shaft 12 by bearings 27. A resilient, cushioning ring 28 is disposed between the conducting member and the bearings to permit the former to yield and accommodate its position to any irregularities that may exist in the workpiece.

A conducting cylinder 29 is carried on a hub positioned on the sleeve 16 for engagement by brushes 30 suitably supported and connected to any convenient source of electric current. Conductors 31 having risers similar to those of commutator segments extend from the cylinder 29 along the sleeve 16 and through the inner race of the bearings 20, being suitably insulated therefrom. Connections 32 are secured to the conductors 31 and extend through holes 33 spaced circumferentially of the disk 19 adjacent the sleeve 16. The connections 32 extend radially outward and terminate in contact blocks 34. The blocks 34 are held against a lateral face of the annular conducting member 25 by springs 35. Screws 36 are threaded in the ends of cups 37 spaced circumferentially of the disk 19 and are provided with backing blocks 38. By means of the screws 36 the pressure exerted by the blocks 34 on the annular conducting member may be varied. The disk 24 has a shoulder 39 effective to hold the annular conducting member in position against the pressure of the springs 35.

The annular conducting member 25 comprises a contact rim 40, an intermediate ring 41 and a body 42. The rim 40 and the ring 41 are generally similar in construction each being composed of a conducting portion cast about a reinforcing annulus. The latter may be of steel or other suitable material. The reinforcing annulus for the rim 40 is shown at 43 while that for the ring 41 is shown at 44.

The annulus 44 has an inwardly extending flange 45. The ring 41 is pushed in place after one of the disks composing the body 42 has been mounted on the ring 28. The other disk composing the body 42 is then placed as shown. The ring is then secured to the disks by bolts 46.

The conducting material cast about the reinforcing annulus 44 to form the ring 41 is preferably copper. The conducting material forming the rim 40 is preferably an alloy which is highly conductive yet exhibits a hardness greater than that of copper. The rim 40 is fitted on the ring 41 before assembly with the disks 19 and 24 and welded thereto as shown at 47. Wearing strips 48 are disposed in the lateral faces of the body 42 of the conducting member to cooperate with bearing surfaces 49 formed on the disks 19 and 24. These strips may be of insulation if it is desired to insulate the electrode. In this case, an additional strip of insulation is provided on the shoulder 39. The disks 19 and 24 are provided with peripheral flanges 50 shaped to engage a workpiece having progressive contact with the conducting member 25. As an example of such workpiece, I have shown an I-beam 51 being formed of flange plates 52 and a web plate 53 by welding the edges of the latter to ribs 54 formed intermediate the edges of the former. I-beams can conveniently be manufactured by welding plates disposed in this edge-to-side relationship, on passing them through a welding throat composed of a pair of electrodes such as that which has been described above in detail and will be referred to generally by the numeral 55 and a pair of cooperating electrodes 56. To this end, the shaft 13 is provided with an electrode 55 which is substantially a duplicate of that already described in detail. The electrodes 56 are shown in Figs. 10 and 11 and will be described later. They are composed principally of a pair of conducting disks 127 disposed in spaced relation and supported for rotation about vertical axes in bearings mounted in a carriage (not shown) intermediate the carriages 15. The annular conducting members 40 of the electrodes 55 and the disks 127 of the electrodes 56 cause welding current to pass across the joints 59 between the flange plates 52 and the web plate 53. The flanges 50 of the disks 19 and 24 engage the flange plates 52 and by suitable adjustment of the carriages 15 may be caused to exert sufficient pressure thereon to effect a welding of the joints 59 when the abutting surfaces have been heated to fusion temperature. The flanges 50 are tapered laterally to concentrate the pressure exerted thereby adjacent the plane of the web plate, and avoid bending the edges of the flange plates downwardly. The annular conducting member 25 of the electrode may be caused to exert sufficient pressure on the web plates to insure good electrical contact therewith by adjusting the angular positions of the shafts 12 and 13 and their eccentrics 26. It will be apparent that on rotation of the shafts 12 and 13 the annular conducting members of the electrodes may be caused to advance toward or retract from the work, being free to slide radially between the disks 19 and 24. This sliding movement of the conducting member 25 between the flanking pressure-applying disks, continues during normal operation of the apparatus. In other words, as the electrodes rotate during passage of the work through the throat, the conducting member slides between the disks because its axis of rotation (the axis of the eccentric 26) does not coincide with the axis of rotation of the disks (the axis of the shaft 12).

Angular adjustment of the shafts 12 and 13 may be effected by fluid operated cylinders and pistons 12a and 13a (see Figs. 1 and 3) operating through linkages 12b and 13b and cranks 12c and 13c. The cranks are secured to squared end portions of the shafts. The linkages includes crossheads 12d and 13d reciprocable along slides 12e and 13e.

Guide rings 60 are removably secured to the outer lateral faces of the disks 19 and 24 for engagement with the edges of the flange plates 52. The spacing between the inner edges of the guide rings may be varied by means of shims 61.

I provide independent drives for the disks 19 and 24 and for the conducting member 25 of the electrodes 55. The sleeve 16 for example, is driven by a motor 62 through gearing 63, a shaft 64 and a pinion 65 meshing with a gear 66 keyed on the sleeve. The sleeve 21 is similarly driven but only the shaft 67, pinion 68 and gear 69 of the drive for the sleeve 21 are shown in Fig. 1. The drives for the disks 19 and 24 are so designed and operated that the disks turn at the same speed.

The drive for the conducting member 25 of the electrode is best shown in Figs. 4-7 in connection with a modified electrode and includes a motor 70 mounted on the sleeve 21. The motor is preferably an adjustable-speed reversing motor. Through reduction gearing 71 an overtravel clutch 71a, and a shaft 72 the motor 70 drives a pinion 73 keyed on a shaft 73a. The shaft is journalled in bearing plates 73b carried on a bracket 74 secured to the disk 24. The clutch permits the member 25 to turn faster than it is actually driven by the motor 71 to keep up with the pieces being welded, if they exceed a given speed for any reason. The pinion 73 meshes with a circular rack 75 secured to the annular conducting member 25. The pinion and rack are shrouded to prevent jamming. Rollers 76 engage the back of the rack 75. Current is supplied to the motor 70 through slip rings 77 secured to the disk 24 and connections indicated at 78. The shaft 73a extends through a bore 74a in the bracket 74 which is large enough to permit movement of the shaft, its roller 73c and plates 73b as required by the eccentricity of the member 25 relative to the members 19 and 24. This movement is effected by the cooperation of the shrouds of the pinion 73 and rollers 76 with the rack 75. The electrode drive shown diagrammatically in Fig. 1 is similar to that of Figs. 4-7 but differs slightly as to the mounting of the motor.

By means of the motor 70 the conducting portion 25 of the electrodes 55 may be driven at the same peripheral speed as the pressure applying portions 50 of the disks 19 and 24 or at speeds differing from that of the latter.

If the radius of the conducting member 25 is less than that of the pressure applying members 19 and 24, as shown in Figs. 2 and 3, the axis of the former must be positioned by adjustment of the shaft 12 to a level below that of the latter. If the peripheral speed of the member 25 is to be the same as that of the members 19 and 24, the former will have to be driven at an angular velocity slightly greater than that of the latter. Since the drive for the member 25 is mounted on sleeve 21 of member 24, the motor 70 is adjusted to operate at a speed sufficient only to provide the additional angular velocity of the member 25 over that of member 24 to bring the peripheral speed of the former up to that of the latter.

If the radius of the member 25 is greater than that of members 19 and 24, as it will likely be when newly installed, the desired pressure will be exerted by the former before its axis has been shifted by angular adjustment of the shaft 12, to a point below that of the latter. Because of its greater radius, the member 25 must turn at an angular velocity less than that of the members 19 and 24. This is accomplished by reversing the motor 70 relative to its direction of rotation when the converse obtains as above described. The actual angular velocity of the member 25 is thus that of the members 19 and 24 less that due to reverse operation of the motor.

The independent drive for the conducting portion 25 of the electrode may be employed to effect redressing of the surface of the latter. To this end the conducting portion is driven at a speed such that its peripheral velocity differs from the linear speed at which the work advances, necessitating sliding contact therebetween, which serves as a light grinding to true the electrode periphery. Normally, however, the peripheral speed of the conducting and pressure-applying portions of the electrode is equal to the linear speed at which the work advances.

The operation of the apparatus described above will doubtless be apparent without further explanation. It will be understood that the flange and web plates are forwarded to the electrodes 55 and 56 in assembled relation by any suitable means which does not form part of the present invention. As the assembled flange and web plates enter and pass through the throat defined by the electrodes, current flows across the joints 59, heating them to fusion temperature. The pressure-applying disks 19 and 24 of the electrodes 55 exert sufficient pressure on the flange plates to effect the upsetting at the joints which is necessary to form a sound, continuous weld. Because of the eccentric relation of the conducting member 25 of the electrode and the pressure-applying disks thereof, the work-piece passes through the zone of maximum current flow therethrough prior to passing the zone wherein the maximum welding pressure is exerted. This is desirable because it permits the heated abutting surfaces to come to proper state for effective welding.

After passing through the welding throat the metal extended from the welded seam is rolled down or removed while still hot and the work-piece is guided along a predetermined path until the weld sets and cools.

Structural shapes other than I-beams such as T's, channels, etc., may be similarly welded from plates by using electrodes designed to provide a welding throat or corresponding shape.

Referring now to Fig. 4, the apparatus there shown is similar in general to that of Fig. 1 through 3. It includes sleeves 16' and 21' having disks 19' and 24' thereon. The sleeves 16' and 21' are keyed to their supporting shaft 12'. The annular conducting member 25' between the disks 19' and 24' is maintained in proper position by yieldable annular means such as a pneumatic tire 79 carried on a rim 80. The rim is rotatably supported on the shaft 12' by bearings 81. A valve stem 82 permits inflation of the tire to the desired pressure. The tire permits yielding of the conducting member of the electrode under excessive pressure, independently of the pressure-applying means.

It will be apparent that the structure of Fig. 4 accomplishes about the same result as that of Figs. 1 through 3 exept that in the latter, the pressure exerted by the conducting member of the electrode may be varied while it is rotating.

Fig. 8 shows apparatus embodying the invention adapted for the welding of pipe. As there shown, pressure applying disks 83 and 84 have their hubs 85 and 86 keyed to a shaft 87. The disks have pipe engaging lips or portions 88. Between the latter a twin disk electrode 89 is disposed. The electrode comprises conducting disks 90 and 91 and is secured to a supporting ring 92. The electrode and its ring are slidable between the pressure-applying disks and are normally maintained in position by a pneumatic tire 93, as in the case of the structure shown in Fig. 4.

Electric current is delivered to the two disks 90 and 91 of the electrode by connections 94 extending parallel to the shaft and terminating in contact blocks 95. Alternate connections 94 are connected to opposite poles of a current source. As shown in Fig. 8, the blocks 95 to which one connection is secured engages a lateral face of one of the disks 90 or 91 while the adjacent block similarly engages a face of the other disk, the disks and their connections being insulated from each other. A bottom support roll 96 cooperates with the electrode shown in Fig. 8 to form a welding throat for tubular material such as pipe.

It has been found impossible heretofore to weld heavy wall tube with an electrode embracing substantially 180° of the tube section, because of the large portion of the welding current which passes around the body of the blank instead of crossing the seam. The construction shown in Fig. 8 avoids this difficulty since the conducting portion of the electrode engages the blank over only a small part of the latter's periphery. The lips 88 being insulated from the disks 90 and 91 merely cooperate with the roll 96 to apply welding pressure without shunting any substantial amount of welding current around the body of the blank.

The apparatus shown in Fig. 8 thus performs a novel method since it delivers welding current to the material being welded adjacent the abutting edges only, while simultaneously applying welding pressure to the material in a region more remote from said edges.

Fig. 9 illustrates a modification similar to that of Fig. 8 except that current is supplied to the electrode from slip rings 97 on opposite sides thereof. From the slip rings, connections 98 extend axially of a supporting shaft 99 terminating in contact blocks 100 having sliding engagement with disks 101 and 102 forming the conducting portion of the electrode. The disks are slidably disposed between lips 103 of pressure applying disks 104 and 105 carried on the shaft. A pneumatic tire 106 yieldably maintains the conducting disks in proper position. Bearing rings 107 of insulation separate the disks 104 and 105 from the disks 101 and 102.

Figs. 10 through 12 illustrate the details of the vertical electrodes 56 which cooperate with the horizontal electrodes 55 to form the welding throat. As shown in Fig. 10, a vertical shaft 110 carries a pressure applying disk 111. The shaft 110 is journaled in suitable bearings (not shown), may be driven by any suitable means if desired, and is provided with an enlarged portion 112 on which the disk 111 is keyed. A sleeve 113 is angularly adjustable about the shaft 110 being supported thereon by bearings 114. A similar sleeve 113' is rotatable about the shaft on bearings 114', below the enlargement 112. Hubs 115 are journaled on the sleeves 113 and 113', being supported by bearings 116. Supporting disks 117 are likewise journaled on the sleeves 113 and 113', being supported thereon by bearings 118. Resilient cushions 119 are disposed between the supporting disks and their bearings. Conducting rings 120 are secured to the disks 117. Contact blocks 121 are urged into engagement with the rings 120 by springs 122, similar to those shown at 35 in Fig. 2.

Current is supplied to the blocks 121 by flexible leads 122a extending thereto from cylinders 123 disposed coaxially with sleeve extensions 113a and 113b carried on the sleeve 113 and 113', and provided with brushes 124 having sliding engagement with the sleeves. Spring urged brush holders 124a press the brushes against the sleeves and flexible connections 124b on the brushes are secured to the cylinders 123. The cylinders 123 have flanges 123a which are slotted as at 123b to receive segments 123c to which the cables 122a are secured, the flanges of the cylinders 123 being bolted to the hubs 115. An annular terminal 125 is secured to the end of each of the sleeves and has a flexible conducting connection 126 leading to a suitable source of current.

Contact rings 127 are carried jointly by the rings 120 and the disks 117, being welded to the former as at 128. Wearing rings 129 of insulation, are disposed between the contact rings 127 and the pressure disk 111.

The portions of the sleeves 113 and 113' on which the bearings 116 and 118 are disposed are eccentric to the axis of the shaft 110. Thus by rotating the sleeves, the rings 127 may be caused to move toward or away from the web plate 53. The position of the pressure disk 111 relative to the web plate is controlled by adjusting the bearings in which the shaft rotates by suitable screws. The sleeves are provided with cranks 130 (the latter are shown rotated 90° from their actual position in Fig. 10). A fluid-pressure operated piston and cylinder is effected to swing the cranks 130 in about the same manner as the pistons and cylinders 12a and 13a operate the cranks 12c and 13c. The conducting connections 126 are sufficiently flexible to permit angular adjustment of the sleeves in this manner. A single piston or cylinder may be employed to shift the cranks 130 connected to both the sleeves, if the cranks are connected by a suitable cross arm or link.

It will be apparent from the foregoing description that the invention provides an electrode capable of exerting the high pressures necessary in progressively welding certain kinds of products and is characterized at the same time by the conductivity necessary to deliver large welding currents to the work. By providing pressure-applying means separate from the current conducting means the latter is relieved of the necessity of exerting heavy forces on the material being welded. The current conducting portion of the electrode is movable independently of the pressure-applying portion. This insures uniform contact with the work at the desired pressure at all times regardless of the fact that the metal of the conducting portion of the electrode will wear more rapidly than that of which the pressure-applying portions are composed. The pressure exerted by the conducting portion can be varied independently of that exerted by the pressure-applying portions. This results in longer electrode life and a reduction in the pitting and burning of the conducting portion thereof.

A further advantage of the invention lies in the fact that the plane containing the axis of the conducting portion of the electrode is displaced slightly from that containing the axis of the pressure-applying portions. The point of maximum temperature is slightly ahead of the point at which the pressure-applying portions of the electrode have their greatest effect. The back-up provided for the conducting portion of the electrode permits it to follow any variations in the material being welded, maintaining proper contact pressure so as to deliver the required welding current regardless of surface irregularities. A further advantage of the invention is the fact that the conducting portion of the electrode may be driven at a peripheral speed different from the linear speed of the work being welded whereby the sliding engagement effects a redressing of the electrode.

Although I have disclosed herein but a preferred embodiment with certain modifications, it will be understood that changes in the construction and practice illustrated and described may be made without departing from the spirit of the invention nor the scope of the appended claims.

I claim:

1. A roller electrode comprising an annular pressure applying member and an annular conducting member thereadjacent, means for driving said pressure applying member and means independent of said last-mentioned means for driving said conducting member.

2. A rotatable welding electrode comprising an annular member composed of material having good electrical conductivity, an annular pressure applying member adjacent but independent of said first-mentioned member, a shaft supporting said members, and a compressible annulus between said conducting member and said shaft.

3. A welding electrode comprising a shaft having an eccentric portion thereon, an annular conducting member rotatably mounted on said portion, an annular pressure applying member, means mounting said last-mentioned member adjacent said first-mentioned member for rotation about the axis of said shaft, and means for angularly shifting said shaft.

4. An electrode comprising a shaft, an annular conducting member rotatably mounted thereon, a sleeve rotatable about said shaft, an annular pressure applying member on said sleeve adjacent said conducting member, means for driving said sleeve to rotate said pressure applying member, and independent means mounted on said pressure applying member for driving said conducting member.

5. A welding electrode comprising a shaft, an annular conducting member rotatably mounted thereon, sleeves rotatable about said shaft on opposite sides of said member, annular pressure applying members on said sleeves flanking said conducting member, conductors extending axially of one sleeve and terminating in blocks having sliding engagement with a lateral face of said conducting member, the pressure applying member on the other sleeve having a shoulder against which the other lateral face of said conducting member bears.

6. An electrode comprising a shaft, a pressure applying disc thereon, annular conducting members journaled on said shaft flanking said disc, and means supporting said members for movement radially of said disc.

7. An electrode comprising a shaft, a pressure-applying disc thereon, a sleeve on said shaft having an eccentric portion, an annular conducting member journalled on said portion, and means for effecting angular adjustment of said shaft to move said member radially of said disc.

8. A welding electrode comprising a shaft, an annular conducting member, means mounting said member for rotation on said shaft, an annular pressure applying member, means rotatably supporting said last-mentioned member adjacent said conducting member but independently thereof, said first-mentioned means including means whereby the pressure exerted by said conducting member on a work piece engaged by said pressure-applying member may be varied.

9. A rotatable welding electrode comprising an annular member composed of material having good electrical conductivity, an annular pressure applying member adjacent but independent of said first-mentioned member, and means mounting said first-mentioned member for movement radially of the pressure-applying member including yielding means normally urging said conducting member into engagement with a workpiece moving past the electrode.

10. A rotatable welding electrode comprising a central annulus composed of material having good electrical conductivity, and pressure applying annuli flanking said central annulus, all said annuli being journaled on a common shaft, said central annulus being movable between said flanking annuli.

11. A welding electrode comprising an annular pressure applying member, an annular conducting member thereadjacent composed of material having good electrical conductivity, both said members being journaled on a common shaft, and means for shifting one of said members radially of the other.

12. A roller electrode comprising an annular pressure applying member and an annular conducting member thereadjacent, both said members being journaled on a common shaft and having tangential contact with a moving workpiece, and means for shifting said conducting member toward and away from said workpiece.

13. A rotatable welding electrode comprising an annular member composed of material having good electrical conductivity, a shaft supporting said member, an annular pressure applying member adjacent but independent of said first-mentioned member, and yielding means between said shaft and conducting member normally centering said conducting member with said pressure applying member but permitting displacement of the former relative to the latter.

14. A rotary welding electrode comprising a shaft, a current conducting annular portion composed of material having good electrical conductivity and pressure applying annular portions flanking said current conducting portion on each side, all said portions being journaled on said shaft, said conducting portion being movable radially of said pressure-applying portions.

JAMES V. CAPUTO.